US010990939B2

(12) United States Patent
Fan et al.

(10) Patent No.: US 10,990,939 B2
(45) Date of Patent: Apr. 27, 2021

(54) METHOD AND DEVICE FOR VOICE BROADCAST

(71) Applicant: ADVANCED NEW TECHNOLOGIES CO., LTD., Grand Cayman (KY)

(72) Inventors: Yicong Fan, Hangzhou (CN); Tian Chen, Hangzhou (CN); Guolai Ma, Hangzhou (CN); Liang Zhang, Hangzhou (CN); Han Mei, Hangzhou (CN); Bei Liu, Hangzhou (CN); Yong He, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/860,053

(22) Filed: Apr. 27, 2020

(65) Prior Publication Data

US 2020/0258063 A1 Aug. 13, 2020

Related U.S. Application Data

(63) Continuation of application No. PCT/CN2020/071482, filed on Jan. 10, 2020.

(30) Foreign Application Priority Data

Apr. 15, 2019 (CN) .......................... 201910298310.9

(51) Int. Cl.
*G06Q 20/10* (2012.01)
*H04L 12/18* (2006.01)
(Continued)

(52) U.S. Cl.
CPC .......... *G06Q 20/102* (2013.01); *G06F 3/167* (2013.01); *H04L 12/18* (2013.01); *H04L 67/06* (2013.01); *H04L 67/306* (2013.01)

(58) Field of Classification Search
CPC ....... G06Q 20/102; G06F 3/167; H04L 12/18; H04L 67/06; H04L 67/306
See application file for complete search history.

(56) References Cited

U.S. PATENT DOCUMENTS 6,640,145 B2 10/2003 Hoffberg et al.
6,834,195 B2 12/2004 Brandenberg et al.
(Continued)

FOREIGN PATENT DOCUMENTS

CN 103152106 A 6/2013
CN 105245583 A 1/2016
(Continued)

OTHER PUBLICATIONS

First Search dated May 7, 2020, issued in related Chinese Application No. 201910298310.9 (2 pages).
(Continued)

*Primary Examiner* — Stephen J Clawson (57) ABSTRACT

A voice broadcast method includes: acquiring at least one piece of voice information; delivering the at least one piece of voice information to a voice broadcast device, wherein, the at least one piece of voice information includes voice identification information and a voice content; determining a first voice content to be broadcast by the voice broadcast device, wherein the first voice content is included in the at least one piece of voice information stored at the voice broadcast device; and sending, to the voice broadcast device, a first voice identification information corresponding to the first voice content, wherein the first voice identification information is used by the voice broadcast device to obtain the first voice content stored at the voice broadcast device, and to broadcast the first voice content when a preset voice broadcast condition is met.

20 Claims, 4 Drawing Sheets

(51) Int. Cl.
  *H04L 29/08* (2006.01)
  *G06F 3/16* (2006.01)

(56) References Cited

U.S. PATENT DOCUMENTS

| | | | |
|---|---|---|---|
| 7,010,293 | B2 | 3/2006 | Go |
| 7,039,165 | B1 | 5/2006 | Saylor et al. |
| 7,127,403 | B1 | 10/2006 | Saylor et al. |
| 7,865,137 | B2 | 1/2011 | Goldberg et al. |
| 8,036,418 | B2 | 10/2011 | Meyer et al. |
| 8,112,504 | B2 | 2/2012 | Logan et al. |
| 8,230,343 | B2 | 7/2012 | Logan et al. |
| 8,315,554 | B2 | 11/2012 | Levy et al. |
| 8,694,533 | B2 | 4/2014 | Oztaskent et al. |
| 8,965,313 | B2 | 2/2015 | Ellis et al. |
| 9,143,839 | B2 | 9/2015 | Reisman |
| 9,419,665 | B2 | 8/2016 | Ellis et al. |
| 9,531,760 | B2 | 12/2016 | LaJoie et al. |
| 9,762,635 | B2 | 9/2017 | Sebastian et al. |
| 9,959,343 | B2 * | 5/2018 | Sharma .................. G06F 3/165 |
| 2002/0077084 | A1 * | 6/2002 | Zellner ............. G06Q 30/0267 |
| | | | 455/414.2 |
| 2004/0147265 | A1 * | 7/2004 | Kelley ................. H04W 4/029 |
| | | | 455/445 |
| 2005/0239448 | A1 * | 10/2005 | Bayne .................. H04M 1/021 |
| | | | 455/414.3 |
| 2007/0060114 | A1 | 3/2007 | Ramer et al. |
| 2007/0149208 | A1 * | 6/2007 | Syrbe .................... H04W 64/00 |
| | | | 455/456.1 |
| 2009/0164287 | A1 * | 6/2009 | Kies .................. G06Q 30/0277 |
| | | | 705/1.1 |
| 2009/0197582 | A1 * | 8/2009 | Lewis .................... H04L 67/18 |
| | | | 455/414.2 |
| 2010/0205628 | A1 | 8/2010 | Davis et al. |
| 2011/0035286 | A1 * | 2/2011 | Kim ..................... H04L 67/306 |
| | | | 705/14.66 |
| 2011/0141963 | A1 * | 6/2011 | Lim ..................... H04L 12/189 |
| | | | 370/312 |
| 2012/0023131 | A1 | 1/2012 | Downey et al. |
| 2013/0346560 | A1 * | 12/2013 | Macchietti .......... H04L 43/0888 |
| | | | 709/219 |
| 2014/0181270 | A1 * | 6/2014 | Millington .............. G06F 3/167 |
| | | | 709/219 |
| 2015/0082338 | A1 | 3/2015 | Logan |
| 2015/0331665 | A1 * | 11/2015 | Ishii ................... H04N 21/4826 |
| | | | 715/728 |
| 2016/0210952 | A1 | 7/2016 | Turner |
| 2017/0272481 | A1 * | 9/2017 | Beckhardt .......... H04N 21/6125 |
| 2017/0329848 | A1 * | 11/2017 | Goodman ........... G06F 16/3329 |
| 2018/0260855 | A1 * | 9/2018 | Yu ....................... G06Q 30/0269 |
| 2019/0012134 | A1 * | 1/2019 | Chang ..................... G06F 3/167 |
| 2019/0394320 | A1 | 12/2019 | Ellis |
| 2020/0034401 | A1 | 1/2020 | Scannell, Jr. |
| 2020/0082814 | A1 | 3/2020 | Xiong et al. |

FOREIGN PATENT DOCUMENTS

| | | |
|---|---|---|
| CN | 106296320 A | 1/2017 |
| CN | 106998397 A | 8/2017 |
| CN | 107135252 A | 9/2017 |
| CN | 107483719 A | 12/2017 |
| CN | 107766482 A | 3/2018 |
| CN | 107995249 A | 5/2018 |
| CN | 108074571 A | 5/2018 |
| CN | 108564357 A | 9/2018 |
| CN | 108694035 A | 10/2018 |
| CN | 108846054 A | 11/2018 |
| CN | 109034827 A | 12/2018 |
| CN | 109036425 A | 12/2018 |
| CN | 109040326 A | 12/2018 |
| CN | 110162292 A | 8/2019 |

OTHER PUBLICATIONS

First Office Action dated May 11, 2020, issued in related Chinese Application No. 201910298310.9, with English machine translation (27 pages).
Supplementary Search for Chinese Application No. 201910298310.9 dated Nov. 10, 2020.
Written Opinion and International Search Report for PCT Application No. PCT/CN2020/071482 made available to public dated Oct. 22, 2020.
Supplementary Search for Chinese Application No. 201910298310. 9, dated Jan. 26, 2021, 1 page.

* cited by examiner

METHOD AND DEVICE FOR VOICE BROADCAST

CROSS-REFERENCE TO RELATED APPLICATIONS

This application is a continuation application of International Patent Application No. PCT/CN2020/071482, filed on Jan. 10, 2020, which claims priority to and benefits of the Chinese Patent Application No. 201910298310.9, filed on Apr. 15, 2019. The contents of the above-referenced applications are incorporated herein by reference in their entirety.

TECHNICAL FIELD

This specification relates to the field of the Internet and voice processing technologies, and in particular, to a voice broadcast method and apparatus.

BACKGROUND

In network transactions, marketing activities of a transaction platform and the rights and interests of merchants are accurately delivered to corresponding merchants by a voice broadcast method through the Internet of Things (IoT) long-tail devices to improve the number of collection of payments for merchants.

SUMMARY OF THE INVENTION

One or more embodiments of this specification aim to provide a voice broadcast method and device, to improve the timeliness and accuracy of the voice broadcast.

One or more embodiments of this specification provide a voice broadcast method, including: acquiring at least one piece of voice information; delivering the at least one piece of voice information to a voice broadcast device, wherein, the at least one piece of voice information includes voice identification information and a voice content; determining a first voice content to be broadcast by the voice broadcast device, wherein the first voice content is included in the at least one piece of voice information stored at the voice broadcast device; and sending, to the voice broadcast device, a first voice identification information corresponding to the first voice content, wherein the first voice identification information is used by the voice broadcast device to obtain the first voice content stored at the voice broadcast device, and to broadcast the first voice content when a preset voice broadcast condition is met.

In one embodiment, the determining a first voice content to be broadcast by the voice broadcast device comprises: determining, according to a preset voice broadcast rule, whether the target voice broadcast device needs to broadcast a voice content; and determining, in response to determining that the voice broadcast device needs to broadcast a voice content, that the first voice content is to be broadcast by the voice broadcast device.

In one embodiment, the determining, according to a preset voice broadcast rule, whether the voice broadcast device needs to broadcast a voice content comprises: determining, that the voice broadcast device needs to broadcast the first voice content, in response to: a total number of broadcasts in a first designated time segment is less than a first preset threshold, a first duration from the last broadcast of a voice content reaches a preset duration, or a number of consecutive broadcasts of voice contents in a second designated time segment reaches a second preset threshold.

In one embodiment, the determining a first voice content to be broadcast by the voice broadcast device comprises one of the following: determining the first voice content as a designated voice content according to a preset carousel broadcasting rule, wherein the carousel broadcasting rule is configured to specify a broadcasting order of voice contents in the at least one piece of voice information; and determining the first voice content according to personal information or preference information of a user associated with the voice broadcast device.

In one embodiment, the acquiring at least one piece of voice information comprises: acquiring related information of the voice broadcast device, wherein the related information includes at least one of the following: user information of a user associated with the voice broadcast device, behavior information of the user, preference information of the user, and location information of the voice broadcast device; and acquiring, according to the related information, the at least one piece of voice information corresponding to the voice broadcast device.

In one embodiment, the delivering the at least one piece of voice information to a voice broadcast device comprises: determining, if there is a task of delivering voice information to other voice broadcast devices, priorities respectively corresponding to the voice broadcast device and other voice broadcast devices; and determining, according to the priorities respectively corresponding to the voice broadcast device and the other voice broadcast devices, a delivery time of the at least one piece of voice information, and delivering, according to the delivery time, the at least one piece of voice information to the voice broadcast device.

In one embodiment, the method further includes: obtaining, when an update is performed on the at least one piece of voice information, the updated at least one piece of voice information, wherein the update includes at least one of adding, deleting, or modifying the at least one piece of voice information; and delivering the updated at least one piece of voice information to the voice broadcast device.

In one embodiment, the first voice content includes a transaction voice content, and the determining a first voice content to be broadcast by the voice broadcast device includes: determining, according to a number of transactions or a transaction amount of a user associated with the voice broadcast device, the transaction voice content to be broadcast by the voice broadcast device.

In one embodiment, the determining, according to a number of transactions or a transaction amount of the user, the transaction voice content to be broadcast by the voice broadcast device includes: acquiring a preset mapping relationship between a range of the number of transactions or a range of transaction amounts and the voice content; determining a range of a first number of transactions, wherein the number of transactions falls within the range of the first number of transactions, or determining a first transaction amount range, wherein the transaction amount falls within the first transaction amount range; and determining, according to the range of the first number of transactions, the first transaction amount range, and the mapping relationship, the transaction voice content to be broadcast by the voice broadcast device.

One or more embodiments of this specification provide a voice broadcast device, including: one or more processors; a memory storing instructions executable by the one or more processors to cause the one or more processors to perform operations comprising: acquiring at least one piece of voice information; delivering the at least one piece of voice information to a voice broadcast device, wherein, the at least one piece of voice information includes voice identification information and a voice content; determining a first voice content to be broadcast by the voice broadcast device, wherein the first voice content is included in the at least one piece of voice information stored at the voice broadcast device; and sending, to the voice broadcast device, a first voice identification information corresponding to the first voice content, wherein the first voice identification information is used by the voice broadcast device to obtain the first voice content stored at the voice broadcast device, and to broadcast the first voice content when a preset voice broadcast condition is met.

One or more embodiments of this specification provide one or more non-transitory computer-readable storage media configured with instructions executable by one or more processors to cause the one or more processors to perform operations, including: acquiring at least one piece of voice information; delivering the at least one piece of voice information to a voice broadcast device, wherein, the at least one piece of voice information includes voice identification information and a voice content; determining a first voice content to be broadcast by the voice broadcast device, wherein the first voice content is included in the at least one piece of voice information stored at the voice broadcast device; and sending, to the voice broadcast device, a first voice identification information corresponding to the first voice content, wherein the first voice identification information is used by the voice broadcast device to obtain the first voice content stored at the voice broadcast device, and to broadcast the first voice content when a preset voice broadcast condition is met.

In a technical solution adopting one or more embodiments of this specification, voice information is pre-delivered to a target voice broadcast device, thereby determining the first voice content to be broadcast by the target voice broadcast device, and the first voice identification information corresponding to the first voice content is sent to the target voice broadcast device, so that the target voice broadcast device is capable of obtaining the first voice content locally according to the first voice identification information. It can be seen that the technical solution makes it unnecessary for the target voice broadcast device to download from the server when voice needs to be broadcast, which solves the delay problem when the voice information is downloaded in real time. Moreover, because the voice information is downloaded in advance by the server and stored locally, even if the voice information is changed, there is no need to make any improvement in the device hardware, thereby solving the problem that the update of voice information requires upgrading of hardware such that the information cannot be broadcast in time. This improves the timeliness and accuracy of the voice broadcast.

BRIEF DESCRIPTION OF DRAWINGS

To illustrate the technical solutions in one or more embodiments of this specification or in the prior art more clearly, the following briefly introduces the accompanying drawings required for describing the embodiments or the prior art. Apparently, the accompanying drawings in the following description show merely some embodiments recorded in one or more embodiments of this specification, and a person of ordinary skill in the art may still derive other drawings from these accompanying drawings without creative efforts.

DETAILED DESCRIPTION OF EMBODIMENTS

One or more embodiments of this specification provides a voice broadcast method and device, to improve the timeliness and accuracy of the voice broadcast.

Generally, all voice files are stored in IoT devices in advance, and voice broadcast is triggered by the corresponding scenario. The disadvantage of this method is that the device needs to be upgraded to continue to broadcast if the voice content change. It is not flexible. Another method is to download voice files every time when the IoT device needs to broadcast, but because the hardware of the IoT device is too weak and certain delay occurs in downloading, resulting in the first piece or even the first a few pieces of voice cannot be broadcast.

In order to enable those skilled in the art to better understand the technical solutions in one or more embodiments of this specification, the following clearly and completely describes the technical solutions in one or more embodiments of this specification with reference to the accompanying drawings in one or more embodiments of this specification. Apparently, the described embodiments are only some rather than all of the embodiments of this specification. All other embodiments obtained by those ordinary skilled in the art based on one or more embodiments of this specification without creative work shall fall within the protection scope of one or more embodiments of this specification.

Figure 1:
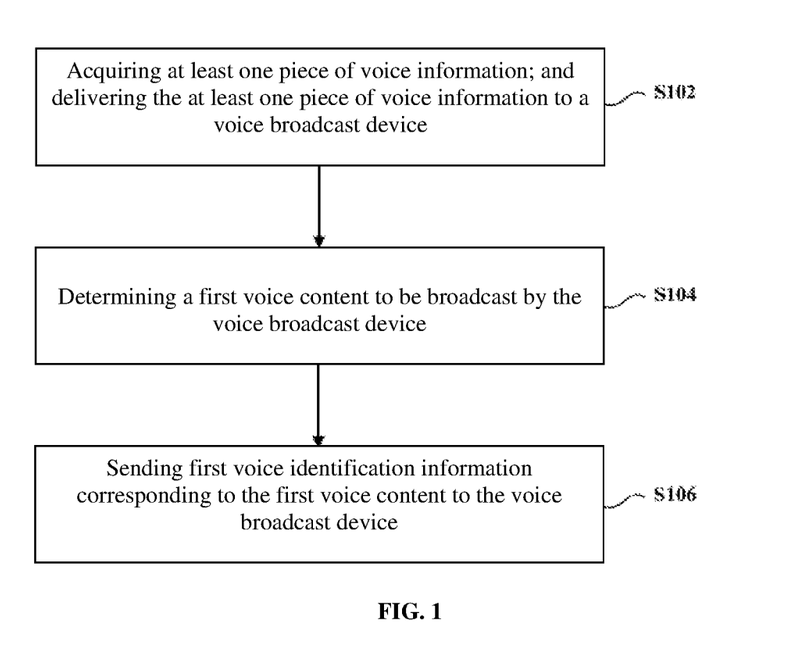
FIG. 1 is a flowchart of a voice broadcast method according to one embodiment of this specification.

FIG. 1 illustrates is a flowchart of a voice broadcast method according to an embodiment of this specification, including the following steps.

At S102, the method may include acquiring at least one piece of voice information to deliver the at least one piece of voice information to a target voice broadcast device. The voice information includes voice identification information and a voice content.

At S104, the method may include determining the first voice content to be broadcast by the target voice broadcast device.

At S106, the method may include sending a first voice identification information corresponding to the first voice content to the target voice broadcast device.

The first voice identification information is used by the target voice broadcast device to obtain the first voice content and broadcast the first voice content when a preset voice broadcast condition is met. The preset voice broadcast conditions may include: broadcasting other voice content of at least one piece of voice information that is not delivered by the server. For example, the target voice broadcast device currently needs to broadcast the first voice content. When the target voice broadcast device broadcasts other voice content, the first voice content may be broadcast after the other voice content broadcast ends.

In some embodiments, the target voice broadcast device stores at least one piece of voice information delivered by the server in advance, including voice identification information and corresponding voice content. Therefore, after receiving the first voice identification information delivered by the server, the target voice broadcast device can locally obtain the first voice content corresponding to the first voice identification information for broadcasting, thereby avoiding the delay caused by downloading the voice content from the server. Especially for IoT devices with weak hardware environment, it can avoid more problems of delay in downloading voice.

In some embodiments, the voice information is pre-delivered to the target voice broadcast device, thereby determining the first voice content to be broadcast by the target voice broadcast device, and the first voice identification information corresponding to the first voice content is sent to the target voice broadcast device, so that the target voice broadcast device is capable of obtaining the first voice content locally according to the first voice identification information. Under such situation, it is unnecessary for the target voice broadcast device to download from the server when voice needs to be broadcast, which solves the delay problem when the voice information is downloaded in real time. Moreover, because the voice information is downloaded in advance by the server and stored locally, even if the voice information is changed, there is no need to make any improvement in the device hardware, thereby solving the problem that the update of voice information requires upgrading of hardware such that the information cannot be broadcast in time. This improves the timeliness and accuracy of the voice broadcast.

In one embodiment, when the at least one piece of voice information is updated, the updated at least one piece of voice information is acquired, and the updated at least one piece of voice information is delivered to the target voice broadcast device. The update to the voice information includes at least one or more actions of adding, deleting, or modifying the voice information.

In on embodiment, by detecting whether the voice information is updated in real time and sending the updated voice information to the target voice broadcast device when the voice information is updated, the hardware of the target voice broadcast device does not need to be upgraded even if the server-side voice information is changed, thereby solving the problem that the update of voice information requires upgrading of hardware such that the information cannot be broadcast in time. This improves the timeliness and accuracy of the voice broadcast.

In one embodiment, related information of the target voice broadcast device may be obtained, and then at least one piece of voice information corresponding to the target voice broadcast device is determined according to the related information, and the determined at least one piece of voice information is the voice information that is obtained in S102 and delivered to the target voice broadcast device. The related information of the target voice broadcast device includes user information of the device user, behavior information of the device user, preference information of the device user, and device location information.

In some embodiments, the user information of the device user may include a user's personal information, such as age, gender, industry category, industry identity, and the like. According to the user information of a device user, the voice information corresponding to the target voice broadcast device may be determined.

For example, if the age of the device user is between 20 and 30 years, and it is assumed that users in this age range prefer food, the voice information related to food may be determined to be voice information corresponding to the target voice broadcast device. As another example, if the industry identity of the device user is a store owner, and the target voice broadcast device is used to broadcast daily payment collection information (including amounts and number of payments), the voice information corresponding to the target voice broadcast device may be determined according to the payment information of the device user, for example, different amounts and/or different times of payments correspond to different voice messages.

The behavior information of the device user may include feedback information of the device user on the historical broadcasted voice contents and may also include behavior information of the device user corresponding to the voice content broadcasted by the device.

According to the feedback information of the device user on the voice content in the historical broadcast, the voice information corresponding to the target voice broadcast device may be determined. The feedback from the device user on the voice content may include a user's behavior on an event related to the voice content. For example, in the voice content of historical broadcasts, device users give more feedback on the voice content related to "free cash withdrawal" (for example, users who have participated in free cash withdrawal activities many times), then it may be determined that the voice information related to "free cash withdrawal" is the voice information corresponding to the target voice broadcast device.

The voice content broadcasted by the target voice broadcast device can determine the behavior information of the device user. When it is assumed that the device user is a product seller and the target voice broadcast device is a transaction voice broadcast device, the voice content broadcast by the transaction voice broadcast device includes the number of transactions and the transaction amount of the commodity seller, that is, the behavior information of the product seller. In the voice information stored on the server, the number of transactions or the transaction amount varies depending on the corresponding voice information.

In some embodiments, because at least one piece of voice information delivered to the target voice broadcast device is determined according to the user information of the device user and/or the behavior information of the device user, and the user information of the device user and/or the behavior information of the device user is not invariable, especially the behavior information of the device user may change in a short period of time, such that the server can determine at least one piece of information delivered to the target voice broadcast device according to the changing information, reflecting the real-time nature and diversity of the voice message delivered by the server.

In one embodiment, the related information may further include device location information, device user preference information, and the like. If the device-related information includes device location information, the voice information corresponding to the target voice broadcast device may be determined according to the device location information. For example, the server side distinguishes cloud storage space based on geographic location information, that is, each geographic location corresponds to its own cloud storage space, and each cloud storage space stores the same or different voice information. If the device location information is Beijing, the voice information in the cloud storage space corresponding to Beijing is first filtered, and then the voice information in the cloud storage space corresponding to Beijing may be directly determined as the voice information corresponding to the target voice broadcast device. According to other factors (such as user information, user behavior information, etc.), the voice information corresponding to the target voice broadcast device may be further filtered from the voice information in the cloud storage space corresponding to Beijing.

If the device-related information includes preference information of the device user, the voice information corresponding to the target voice broadcast device may be determined according to the preference information of the device user. The server may determine the preference information of the device user according to the specified operation of the device user on the voice information and may also determine the preference information of the device user according to the user information and/or behavior information of the device user. The behavior information of the device user may include feedback information of the device user on the historical broadcast voice content. The feedback from the device user on the voice content may include a user behavior on an event involved in the voice content. For example, in the historical broadcast of voice contents, device users have more feedback on voice contents related to "free cash withdrawal" (for example, users who have participated in free cash withdrawal activities for many times), and voice information related to device user preferences and "free cash withdrawal" may be determined.

In one embodiment, after at least one piece of voice information is delivered to the target voice broadcast device, according to a preset voice broadcast rule, whether the target voice broadcast device needs to broadcast the voice content in at least one piece of voice information delivered may be determined. When it is determined that the target voice broadcast device needs to broadcast the voice content in at least one piece of voice information delivered, the first voice content to be broadcast by the target voice broadcast device is determined. The following rules (that is, preset voice broadcast rule) may be used to determine whether the target voice broadcast device needs to broadcast the voice content: when the broadcast information corresponding to the target voice broadcast device meets the preset broadcast condition, said voice content to be broadcast by the target voice broadcast device is determined.

The broadcast information may include, but is not limited to, any one or more of the following: (1) the total number of broadcasts in the first designated time segment, where the total number of broadcasts refers to the sum of the number of times that the target voice broadcast device broadcasts at least the following voice contents: the voice content in at least one piece of voice information delivered by the server, and, the local voice content pre-stored in the target voice broadcast device; (2) the first duration from the voice content in at least one piece of voice information delivered from the last broadcast; and (3) the number of consecutive broadcasts of other voice contents within the second designated time segment, where other voice content refers to voice content other than voice content in at least one piece of voice information delivered by the server, for example, other voice content refers to voice content locally pre-stored in the target voice broadcast device.

Based on the foregoing broadcast information, the preset broadcast conditions may include at least one of the following: the total number of broadcasts in the first designated time segment is less than the first preset threshold, the first duration of the voice content in at least one piece of voice information delivered from the last broadcast reaches the preset duration, and the number of consecutive broadcasts of other voice content within a second designated time segment reaches a second preset threshold, and the like. For example, the first designated time segment is the current whole day. If the total number of broadcasts of the target voice broadcast device on the day is less than 50 times (that is, the first preset threshold), and the duration of the voice content in at least one piece of voice information delivered from the last broadcast reaches 1 hour (that is, the preset duration), the voice content in at least one piece of voice information to be broadcast by the target voice broadcast device is determined. As another example, the second designated time segment is the last 5 hours. If the target voice broadcast device has continuously broadcast other voice content for 10 times in the last 5 hours (that is, the second preset threshold), but has not broadcast the voice content in at least one piece of voice information delivered from the server, it is determined that the target voice broadcast device needs to broadcast the delivered voice content in at least one piece of voice information. After it is determined that the target voice broadcast device needs to broadcast the delivered voice content in at least one piece of the voice information, the first voice content that the target voice broadcast device needs to broadcast may be determined.

In one embodiment, the first voice content that the target voice broadcast device needs to broadcast may be determined in any of the following ways: (1) determining the first voice content according to a preset period broadcasting rule, where the period broadcasting rule is used to specify a carousel broadcasting order of the voice contents in at least one piece of voice information. For example, if 20 voice contents are delivered to the target voice broadcast device, then the carousel broadcasting may be carried out for the 20 voice contents. The server may first determine the voice content that was broadcasted by the target voice broadcast device last time, and then determine the first voice content to be broadcast this time according to the carousel broadcasting order of the 20 voice contents. For example, the carousel broadcasting rule specifies that the carousel broadcasting order of each voice content in at least one piece of voice information is: voice content A, voice content B, voice content C, etc. If the last broadcasted voice content is voice content B, then the first voice content to be broadcast this time is voice content C.

(2) determining that a designated voice content is the first voice content. The device user may specify the first voice content to be broadcasted by the target voice broadcast device in advance. The device user may pre-designate only the first voice content to be broadcast by the target voice broadcast device this time or may pre-designate the voice content to be broadcast by the target voice broadcast device each time within a certain time segment. For example, the device user specifies that the target voice broadcast device broadcasts voice content A when it needs to broadcast voice content for the first time today, and broadcasts voice content B when it needs to broadcast voice content for the second time today, and so on. The server can determine the first voice content that the target voice broadcast device needs to broadcast this time according to the information specified in advance by the device user.

(3) determining the first voice content according to personal information and/or preference information of a device user. The personal information of a device user may include age, gender, industry category, industry identity, and so on. For example, if the industry identity of the device user is a marketer, the voice content that is conducive to promoting marketing may be determined as the first voice content to be broadcast by the target voice broadcast device this time, such as "10 payment collections today will give you free withdrawal benefits".

The preference information of the device user may be determined according to the specified operation of the device user on the voice information, and the preference information of the device user may be also determined according to the user personal information and/or behavior information of the device user. The behavior information of the device user may include feedback information of the device user on the historical broadcast voice content. The feedback from the device user on the voice content may include a user behavior on an event involved in the voice content. For example, in the historical broadcast of voice contents, device users have more feedback on voice contents related to "free cash withdrawal" (for example, users who have participated in free cash withdrawal activities many times), then voice information related to device user preferences and "free cash withdrawal" may be determined. Then, the voice content related to the "free cash withdrawal" may be selected in at least one piece of voice information as the first voice content to be broadcast by the target voice broadcast device.

In one embodiment, when it is determined that the target voice broadcast device needs to broadcast the first voice content in the delivered voice information, the first voice identification information corresponding to the first voice content is sent to the target voice broadcast device, wherein the first the voice identification information is used by the target voice broadcast device to obtain the first voice content, and broadcast the first voice content when a preset voice broadcast condition is reached.

In one embodiment, when at least one piece of voice information is delivered to the target voice broadcast device, if there is currently a task of delivering voice information to other voice broadcast devices, the priorities corresponding to the target voice broadcast device and other voice broadcast devices are determined respectively. Then, according to the respective priorities of the target voice broadcast device and other voice broadcast devices, the delivery time of at least one piece of voice information is determined, and at least one piece of voice information is delivered to the target voice broadcast device according to the delivery time. The delivery time includes the time before the voice information is delivered to other voice broadcast devices, or the time after the voice information is delivered to other voice broadcast devices. Specifically, if the priority corresponding to the target voice broadcast device is higher, at least one piece of voice information is first delivered to the target voice broadcast device, and then the voice information is delivered to other voice broadcast devices; if the priority corresponding to the target voice broadcast device is lower, the voice information is first delivered to other voice broadcast devices, and then at least one piece of voice information is delivered to the target voice broadcast device.

In this embodiment, the priority corresponding to each voice broadcast device may be preset by a user. For example, number 0-10 represents priority levels corresponding to each voice broadcasting device. The larger the number is, the higher the priority is. When voice information is delivered to the target voice broadcast device A and there is a task of delivering voice information to voice broadcast device B, at this time, the priority of the target voice broadcast device A is compared to that of the voice broadcast device B. If the user pre-sets the priority corresponding to the target voice broadcast device A to 10 and the priority corresponding to voice broadcast device B to 9, it indicates that the target voice broadcast device A has a higher priority and that the corresponding voice information can be first delivered to the target voice broadcast device A, and then the corresponding voice information is delivered to the voice broadcast device B.

In some embodiments, when a task of delivering voice information is to be delivered to multiple voice broadcast devices, the execution order of each task may be determined according to the respective priority of the voice broadcast devices, thereby avoiding the pressure when multiple servers are performing simultaneous tasks on the server. The voice broadcast device with higher priority can receive the voice information faster to achieve quicker broadcasting of the voice content to meet the requirements of device users.

Figure 2:
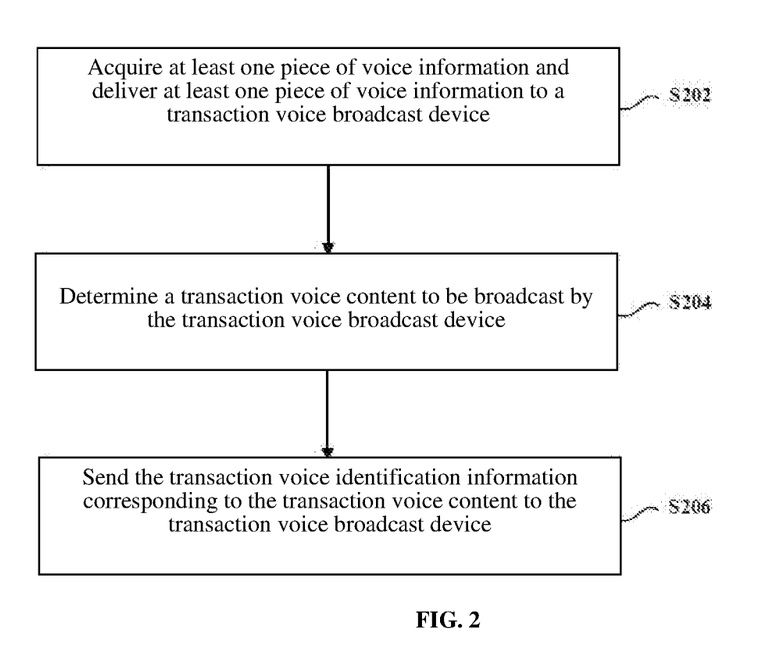
FIG. 2 is a flowchart of a voice broadcast method according to one embodiment of this specification.

In some embodiments, the target voice broadcast device is a transaction voice broadcast device described as an example in the specification of the voice broadcast method. FIG. 2 illustrates is a flowchart of a voice broadcast method according to an embodiment of this specification, including the following steps.

At S202, the method may include acquiring at least one piece of voice information and deliver at least one piece of voice information to a transaction voice broadcast device. The voice information includes voice identification information and voice content.

At S204, the method may include determining a transaction voice content to be broadcast by the transaction voice broadcast device.

At S206, the method may include sending the transaction voice identification information corresponding to the transaction voice content to the transaction voice broadcast device.

The transaction voice identification information is used by the transaction voice broadcast device to obtain the transaction voice content and broadcast the transaction voice content when it meets a preset voice broadcast condition.

In one embodiment, the transaction information of the device user of the transaction voice broadcast device may be obtained wherein the transaction information may include information such as number of transactions, transaction amount, and the like. Further, at least one piece of voice information corresponding to the transaction voice broadcast device is determined according to the transaction information of the device user wherein the at least one piece of voice information includes voice identification information and voice content, and then the at least one piece of voice information corresponding to the transaction voice broadcast device is delivered to the transaction voice broadcast device. The server can generate statistics of transaction information of device users in real time. Transaction information that falls into different ranges corresponds to different voice information. For example, the number of transactions per day ranging from 50 to 100 corresponds to voice information set A, the number of transactions per day ranging from 100 to 200 corresponds to voice information set B, and so on.

In one embodiment, after the at least one piece of voice information is delivered to the transaction voice broadcast device, it may be determined, according to the preset voice broadcast rule, whether the transaction voice broadcast device needs to broadcast the voice content in the at least one piece of voice information. When it is determined that the transaction voice broadcast device needs to broadcast the voice content, the transaction voice content to be broadcast by the transaction voice broadcast device is determined. For example, firstly, the broadcast information corresponding to the transaction voice broadcast device is counted; secondly, whether the broadcast information meets a preset broadcast condition is determined. If the broadcast information meets a preset broadcast condition, it is determined that the transaction voice broadcast device needs to broadcast the transaction voice content in delivered at least one piece of voice information The broadcast information corresponding to the transaction voice broadcast device may include, but is not limited to, any one or more of the following: (1) the total number of broadcasts in the first specified time segment, wherein the total number of broadcasts refers to the sum of the number of times that the transaction voice broadcast device broadcasts at least the following voice contents: the voice content in at least one piece of voice information delivered by the server, and, the local voice content pre-stored in the transaction voice broadcast device; (2) the first duration from the transaction voice content in at least one piece of voice information delivered from the last broadcast; and (3) the number of consecutive broadcasts of other voice contents within the second designated time segment, wherein other voice content refers to voice content other than transaction voice content in at least one piece of voice information delivered by the server, for example, other voice content refers to voice content locally pre-stored in the transaction voice broadcast device.

Based on the foregoing broadcast information, the preset broadcast conditions may include at least one of the following: the total number of broadcasts in the first designated time segment is less than the first preset threshold, the first duration from the last broadcast of the transaction voice content reaches the preset duration, and the number of consecutive broadcasts of other voice content within a second designated time segment reaches a second preset threshold, and the like. For example, the first designated time segment is the current whole day. If the total number of broadcasts by the transaction voice broadcast device on the day is less than 50 (that is, the first preset threshold), and the duration from the last broadcast of the transaction voice content reaches 1 hour (that is, the preset duration), it is determined that the transaction voice broadcast device needs to broadcast the transaction voice content.

As another example, the second designated time segment is the last 5 hours. If the transaction voice broadcast device has continuously broadcast other voice content for 10 times in the last 5 hours (that is, the second preset threshold), but the transaction voice content has not been broadcast, it is determined that the transaction voice broadcast device needs to broadcast the transaction voice content.

In one embodiment, the transaction voice content in the voice information to be broadcast by the transaction voice broadcast device may be determined according to the number of transactions and/or the transaction amount of the device user; and then the transaction voice identification information corresponding to the transaction voice content is sent to the transaction voice broadcast device. The transaction voice identification information is used for the transaction voice broadcast device to obtain the transaction voice content and broadcast the transaction voice content when it meets the preset voice broadcast condition. The preset voice broadcast conditions may include: broadcasting other voice content of at least one piece of voice information that is not delivered by the server. That is, the transaction voice broadcast device currently needs to broadcast the transaction voice content. When the transaction voice broadcast device broadcasts other voice content, the transaction voice content may be broadcast after the other voice content broadcast ends. For example, the transaction voice broadcast device currently needs to broadcast the transaction voice content "10 payment collections today will give you free withdrawal benefits". After the transaction voice broadcast device broadcasts other voice content such as "Alipay received RMB XX", the transaction voice content "10 payment collections today will give you free withdrawal benefits" is broadcast additionally.

When the transaction voice content in the voice information that the transaction voice broadcast device needs to broadcast is determined according to the number of transactions and/or the transaction amount, the following steps may be performed.

At first step, a preset mapping relationship between a range of the number of transactions and/or a range of transaction amounts and the voice content may be acquired.

At second step, a range of a first number of transactions and/or a first transaction amount range may be determined. The number of transactions may fall within the range of the first number of transactions, and the transaction amounts may fall within the first transaction amount range.

At third step, according to a range of a first number of transactions, the first transaction amount range, and the mapping relationship, the transaction voice content in the voice information that the transaction voice broadcast device needs to broadcast may be determined.

For example, in the mapping relationship pre-stored by the server, the voice content corresponding to the number of transactions ranging from 1 to 5 is "5 payment collections today will give you more-pay more-return benefits." The voice content corresponding to the number of transactions ranging from 6 to 10 is "10 payment collections today will give you free withdrawal benefits". If the transaction voice broadcast device is about to broadcast the 5th collection voice content and the server determines that the transaction voice broadcast device currently needs to broadcast the transaction voice content, then the transaction voice identification information of the transaction voice content "5 payment collections today will give you more-pay more-return benefits" is delivered to the transaction voice broadcast device, so that the transaction voice broadcast device can additionally broadcast the transaction voice content "5 payment collections today will give you more-pay more-return benefits" after the broadcast of the fifth collection voice content. If the transaction voice broadcast device is about to broadcast the 10th collection voice content and the server determines that the transaction voice broadcast device currently needs to broadcast the transaction voice content, then the transaction voice identification information of the transaction voice content "10 payment collections today will give you free cash withdrawal benefits" is delivered to the transaction voice broadcast device, so that the transaction voice broadcast device can additionally broadcast the transaction voice content "10 payment collections today will give you free cash withdrawal benefits" after the broadcast of the 10th collection voice content.

From the above embodiments, when the technical solution is applied to a transaction voice broadcast scenario, the voice information to be delivered to the transaction voice broadcast device is determined according to user information and/or behavior information of the device user, and the voice information to be delivered to the transaction voice broadcast device is determined according to the transaction information of the device user. The strategy of real-time delivery of the voice information to the transaction voice broadcast device is realized. The techniques require no need to make improvement in the device hardware, thereby solving the problem that the update of voice information requires upgrading of hardware and that the information would be delayed to broadcast. This requires less wait time and improves accuracy of the voice broadcast. In addition, the technical solution can also determine the transaction voice content in the voice information to be broadcast by the transaction voice broadcast device according to the number of transactions and/or the transaction amount of the device user, so that the transaction voice content broadcast by the transaction voice broadcast device may be more consistent with the current collection scenario of the device user, thereby realizing the flexibility and real-time updateability of the transaction voice content to be broadcast by the transaction voice broadcast device.

In some embodiments, the actions may be performed in a different order and still achieve the desired results. In addition, the processes depicted in the accompanying figures do not necessarily require the particular order shown or a sequential order to achieve the desired results.

Figure 3:
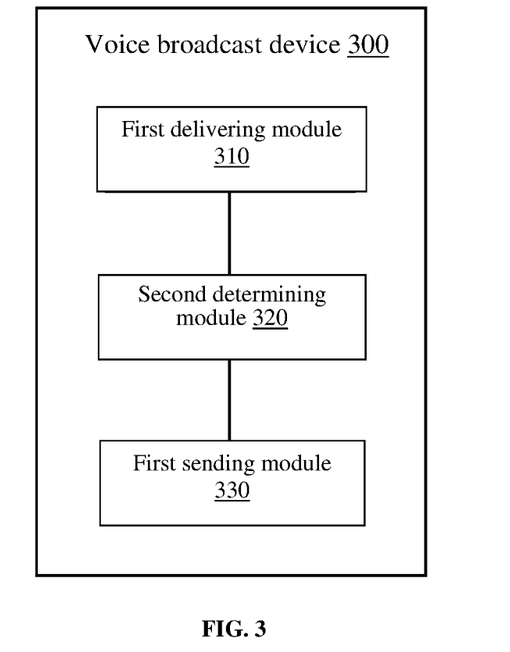
FIG. 3 is a block diagram of a voice broadcast device according to one embodiment of this specification.

One or more embodiments also provide a voice broadcast device. FIG. 3 is a block diagram of a voice broadcast device according to an embodiment of this specification. The voice broadcast device 300 may include: a first delivering module 310, configured to acquire at least one piece of voice information and deliver at least one piece of voice information to a target voice broadcast device, wherein the at least one piece of voice information includes voice identification information and voice content; a first determining module 320, configured to determine a first voice content to be broadcast by the target voice broadcast device; a first sending module 330, configured to send a first voice identification information corresponding to the first voice content to the target voice broadcast device, wherein the first voice identification information is used by the target voice broadcast device to obtain the first voice content, and to broadcast the first voice content when a preset voice broadcast condition is reached.

In one embodiment, the first determining module 320 may include: a first determining unit, configured to determine whether the target voice broadcast device needs to broadcast the voice content according to a preset voice broadcast rule; a first determining unit, configured to determine, if the target voice broadcast device needs to broadcast the voice content, a first voice content to be broadcast by the target voice broadcast device. In one embodiment, the determining unit is further configured to: determine, when the broadcast information corresponding to the voice broadcast device meets a preset broadcast condition, that the target voice broadcast device needs to broadcast the voice content. The broadcast information includes at least one of the total number of broadcasts in the first designated time segment, the first duration from the last broadcast of the voice content, and the number of consecutive broadcasts of other voice contents in the second designated time segment.

In one embodiment, the preset broadcast condition includes at least one of the following: the total number of broadcasts is less than a first preset threshold; the first duration reaches a preset duration; the number of consecutive broadcasts of other voice contents in the second designated time segment reaches a second preset threshold.

In one embodiment, the first determining module includes at least one of the following: a second determining unit, configured to determine the first voice content according to a preset carousel broadcasting rule, wherein the carousel broadcasting rule is used to specify a carousel broadcasting order of each voice content in at least one piece of voice information; a third determining unit, configured to determine that a designated voice content is the first voice content; a fourth determining unit, configured to determine the first voice content according to personal information and/or preference information of a device user.

In some embodiments, the voice information is pre-delivered to the target voice broadcast device to determine the first voice content to be broadcast by the target voice broadcast device, and the first voice identification information corresponding to the first voice content is sent to the target voice broadcast device, so that the target voice broadcast device is capable of obtaining the first voice content locally according to the first voice identification information. It is unnecessary for the target voice broadcast device to download the voice from the server when it needs to be broadcast, and avoid delaying when the voice information is downloaded in real time. Moreover, because the voice information is downloaded in advance by the server and stored locally, even if the voice information is changed, there is no need to make any improvement in the device hardware, thereby solving the problem that the update of voice information requires upgrading of hardware such that the information cannot be broadcast in time. This improves the timeliness and accuracy of the voice broadcast.

Figure 4:
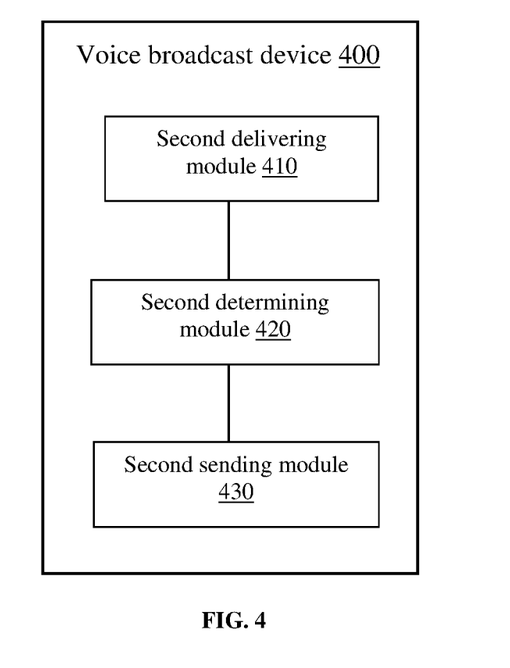
FIG. 4 is a block diagram of a voice broadcast device according to one embodiment of this specification.

FIG. 4 is a block diagram of a voice broadcast device according to an embodiment of this specification. The voice broadcast device 400 may include: a second delivering module 410, configured to acquire at least one piece of voice information to deliver at least one piece of voice information to a transaction voice broadcast device, wherein the at least one piece of voice information includes voice identification information and voice content; a second determining module 420, configured to determine a transaction voice content to be broadcast by the transaction voice broadcast device; a second sending module 430, configured to send a transaction voice identification information corresponding to the transaction voice content to the transaction voice broadcast device, wherein the transaction voice identification information is used by the transaction voice broadcast device to obtain the transaction voice content, and to broadcast the transaction voice content when it meets a preset voice broadcast condition.

In one embodiment, the second determining module 420 includes: a second determining unit, configured to determine whether the transaction voice broadcast device needs to broadcast the voice content according to a preset voice broadcast rule; a fifth determining unit, configured to determine, if the transaction voice broadcast device needs to broadcast the voice content, a transaction voice content to be broadcast by the transaction voice broadcast device.

In one embodiment, the second determining module 420 includes: a sixth determining unit, configured to, according to the number of transactions and/or the transaction amount of the device user, determine the transaction voice content to be broadcast by the transaction voice broadcast device. The sixth determining unit is further configured to: acquire a preset mapping relationship between a range of the number of transactions and/or a range of transaction amounts and the voice content; determine a range of a first number of transactions within which the number of transactions falls and/or determine a first transaction amount range within which the transaction amount falls; determine, according to the range of the first number of transactions, the first transaction amount range, and the mapping relationship, the transaction voice content to be broadcast by the transaction voice broadcast device.

In some embodiments, the flexibility and real-time updateability of the transaction voice content to be broadcast by the transaction voice broadcast device may be realized when the transaction voice content in the voice information to be broadcast by the transaction voice broadcast device according to the number of transactions and/or the transaction amount of the device user is determined such that the transaction voice content broadcast by the transaction voice broadcast device may be more consistent with the current collection scenario of the device user.

Those skilled in the art should understand that the above-mentioned voice broadcast device is capable of being used to implement the aforementioned voice broadcast method, and the detailed description thereof may be similar to that described in the method above.

Figure 5:
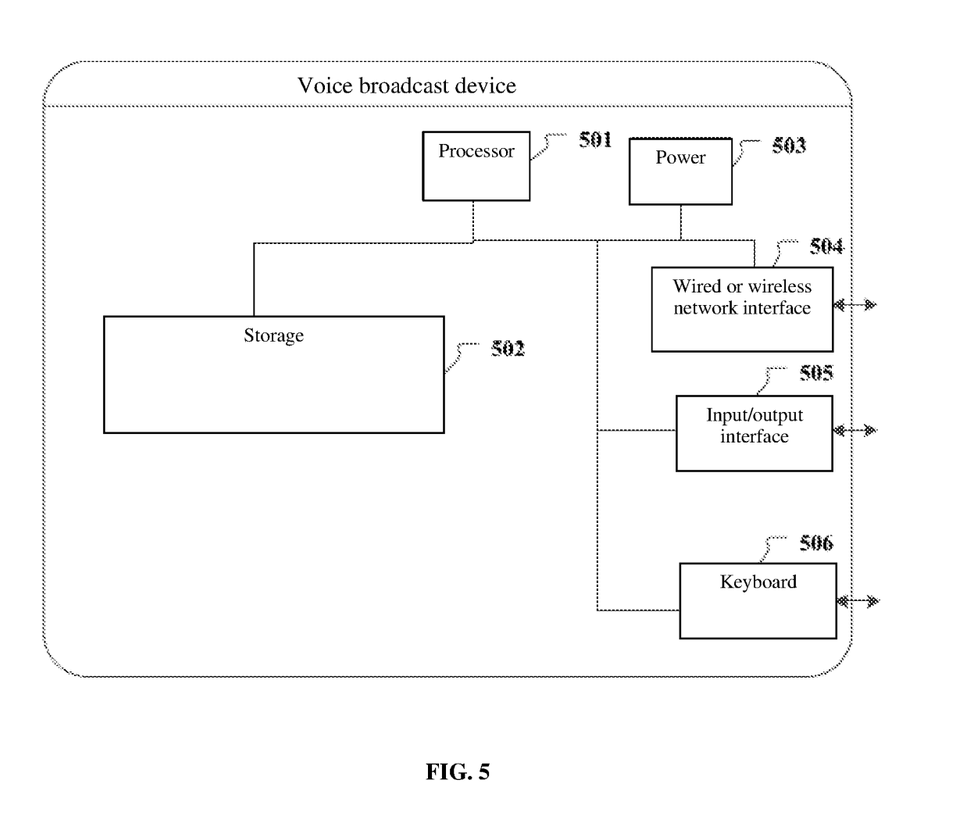
FIG. 5 is a schematic block diagram of a voice broadcast device according to one embodiment of this specification.

One or more embodiments of this specification also provide a voice broadcast device, as shown in FIG. 5. The voice broadcast device may have a relatively large difference due to different configurations or performance and may include one or more processors 501 and a memory 502. The memory 502 may store one or more storage applications or data. The memory 502 may be a temporary storage or a persistent storage. The application program stored in the memory 502 may include one or more modules (not shown in the figure), and each module may include a series of computer-executable instructions in a voice broadcast device. Furthermore, the processor 501 may be configured to communicate with the memory 502 and execute a series of computer-executable instructions in the memory 502 on the voice broadcast device. The voice broadcast device may further include one or more power sources 503, one or more wired or wireless network interfaces 504, one or more input/output interfaces 505, and one or more keyboards 506.

In some embodiments, the voice broadcast device includes a memory and one or more programs, wherein one or more programs are stored in the memory, and one or more programs may include one or more modules, and each module may include a series of computer-executable instructions in a voice broadcast device, and configured for one or more processors to execute one or more programs which include the following computer-executable instructions: acquiring at least one piece of voice information to deliver the at least one piece of voice information to a target voice broadcast device, where the at least one piece of voice information includes voice identification information and voice content; determining a first voice content to be broadcast by the target voice broadcast device; sending the first voice identification information corresponding to the first voice content to the target voice broadcast device, wherein the first voice identification information is used by the target voice broadcast device to obtain the first voice content, and to broadcast the first voice content when it meets a preset voice broadcast condition.

In some embodiments, when the computer-executable instructions are executed, the processor may also be caused to: the determining a first voice content to be broadcast by said target voice broadcast device, including: determining, according to a preset voice broadcast rule, whether the target voice broadcast device needs to broadcast the voice content; determine, if the target voice broadcast device needs to broadcast the voice content, the first voice content to be broadcast by the target voice broadcast device.

In some embodiments, when the computer-executable instructions are executed, said processor may also be caused to: determine, when the broadcast information corresponding to the target voice broadcast device meets a preset broadcast condition, that the target voice broadcast device needs to broadcast the voice content, wherein the broadcast information includes at least one of the total number of broadcasts in the first designated time segment, the first duration since the last broadcast of the voice content, and the number of consecutive broadcasts of other voice contents in the second designated time segment.

In some embodiments, the preset broadcast conditions include at least one of the following: the total number of broadcasts is less than a first preset threshold; the first duration reaches a preset duration; the number of consecutive broadcasts of other voice contents in the second designated time segment reaches a second preset threshold. In some embodiments, when the computer-executable instructions are executed, said processor may also be caused to: determine the first voice content according to a preset carousel broadcasting rule, wherein the carousel broadcasting rule is used to specify a carousel broadcasting order of the voice contents in the at least one voice message; determine that the designated voice content is the first voice content; determine the first voice content according to personal information and/or preference information of a device user.

In some embodiments, when the computer-executable instructions are executed, said processor may also be caused to: acquire related information of the target voice broadcast device, wherein the related information includes at least one of the following: user information of a device user, behavior information of the device user, preference information of the device user, and device location information; acquire the at least one piece of voice information corresponding to said target voice broadcast device according to the related information.

In some embodiments, when the computer-executable instructions are executed, said processor may also be caused to: determine, if there is currently a task of delivering voice information to other voice broadcast devices, priorities respectively corresponding to the target voice broadcast device and the other voice broadcast devices; determine the delivery time of the at least one piece of voice information according to the priorities respectively corresponding to the target voice broadcast device and the other voice broadcast devices, and delivering the at least one piece of voice information to the target voice broadcast device according to the delivery time, wherein the delivery time includes the time before the voice information is delivered to the other voice broadcast devices, or the time after the voice information is delivered to the other voice broadcast devices.

In some embodiments, when the computer-executable instructions are executed, said processor may also be caused to: obtain, when the at least one piece of voice information is updated, the updated at least one piece of voice information, wherein the update to the voice information includes at least one action of adding, deleting, and modifying the voice information; deliver the updated voice information to the target voice broadcast device.

Figure 6:
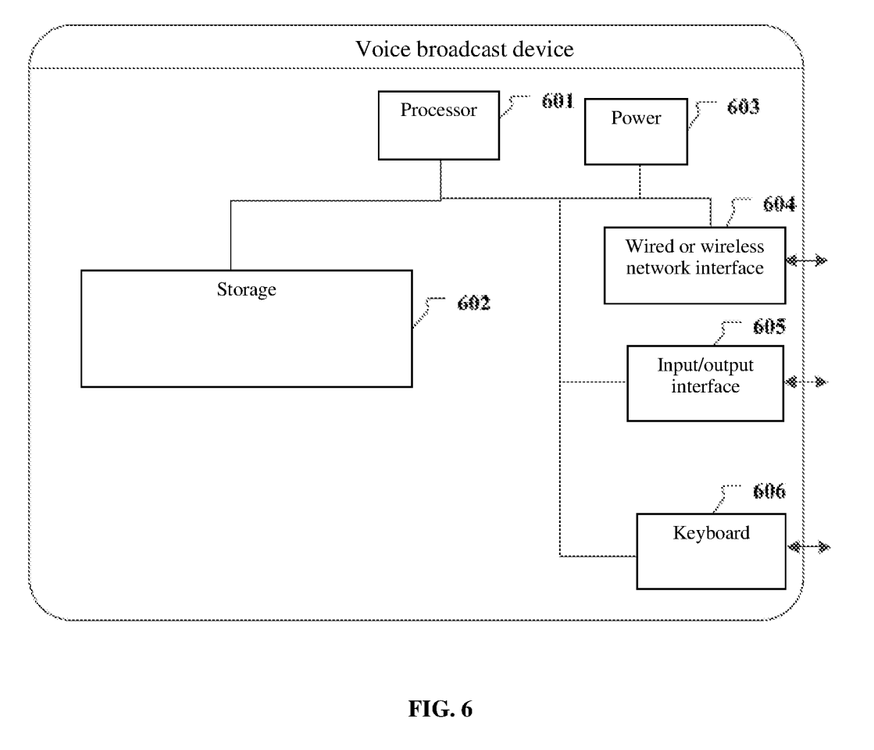
FIG. 6 is a schematic block diagram of a voice broadcast device according to one embodiment of this specification.

One or more embodiments of this specification also provide a voice broadcast device, as shown in FIG. 6. The voice broadcast device may have a relatively large difference due to different configurations or performance and may include one or more processors 601 and a memory 602. The memory 602 may store one or more storage applications or data. The memory 602 may be a temporary storage or a persistent storage. The application program stored in the memory 602 may include one or more modules (not shown in the figure), and each module may include a series of computer-executable instructions in a voice broadcast device. Furthermore, the processor 601 may be configured to communicate with the memory 602 and execute a series of computer-executable instructions in the memory 602 on the voice broadcast device. The voice broadcast device may further include one or more power sources 603, one or more wired or wireless network interfaces 604, one or more input/output interfaces 605, and one or more keyboards 606.

In some embodiments, the voice broadcast device includes a memory and one or more programs, wherein one or more programs are stored in the memory, and one or more programs may include one or more modules, and each module may include a series of computer-executable instructions in a voice broadcast device, and may be configured for one or more processors to execute one or more programs which include the following computer-executable instructions: acquiring at least one piece of voice information; and delivering said at least one piece of voice information to a transaction voice broadcast device, wherein the voice information includes voice identification information and voice content; determining a transaction voice content to be broadcast by the transaction voice broadcast device; sending the transaction voice identification information corresponding to the transaction voice content to the transaction voice broadcast device, wherein the transaction voice identification information is used by the transaction voice broadcast device to obtain the transaction voice content, and to broadcast the transaction voice content when a preset voice broadcast condition is reached.

In some embodiments, when the computer-executable instructions are executed, the processor may also be caused to: determine, according to a preset voice broadcast rule, whether the transaction voice broadcast device needs to broadcast said voice content; determine, if the transaction voice broadcast device needs to broadcast said voice content, a transaction voice content to be broadcast by the transaction voice broadcast device. In some embodiments, when the computer-executable instructions are executed, the processor may also be caused to: determine transaction voice content to be broadcast by the transaction voice broadcast device according to the number of transactions and/or the transaction amount of the device user.

In some embodiments, when the computer-executable instructions are executed, the processor may also be caused to: acquire a preset mapping relationship between a range of the number of transactions and/or a range of transaction amounts and the voice content; determine a range of a first number of transactions within which the number of transactions falls and/or determine a first transaction amount range within which the transaction amount falls; determine, according to the range of the first number of transactions, the first transaction amount range, and the mapping relationship, the transaction voice content to be broadcast by the transaction voice broadcast device.

One or more embodiments of this specification also provide a computer-readable storage medium that stores one or more programs, and the one or more programs include instructions. When the instructions are executed by an electronic device including multiple application programs, the electronic device may be caused to execute the foregoing voice broadcast method and is specifically configured to execute the following: acquiring at least one piece of voice information; delivering the at least one piece of voice information to a target voice broadcast device, wherein the at least one piece of voice information includes voice identification information and voice content; determining a first voice content to be broadcast by the target voice broadcast device; sending the first voice identification information corresponding to the first voice content to the target voice broadcast device, wherein the first voice identification information is used by the target voice broadcast device to obtain the first voice content, and to broadcast the first voice content when a preset voice broadcast condition is reached.

One or more embodiments of this specification also provide a computer-readable storage medium that stores one or more programs, and the one or more programs include instructions. When the instructions are executed by an electronic device including multiple application programs, the electronic device may be caused to execute the foregoing voice broadcast method and is specifically configured to execute the following: acquiring at least one piece of voice information; delivering the at least one piece of voice information to a transaction voice broadcast device, wherein the voice information includes voice identification information and voice content; determining a transaction voice content to be broadcast by the transaction voice broadcast device; sending the transaction voice identification information corresponding to the transaction voice content to the transaction voice broadcast device, wherein the transaction voice identification information is used by the transaction voice broadcast device to obtain the transaction voice content, and to broadcast the transaction voice content when it meets a preset voice broadcast condition.

The system, device, module, or unit described in the foregoing embodiments may be specifically implemented by a computer chip or entity, or a product with a certain function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For the convenience of description, when the above device is described, the functions are divided into various units and described separately. Certainly, when one or more embodiments of this specification are implemented, the functions of each unit may be implemented in the same or a multiple pieces of software and/or hardware.

Those skilled in the art should understand that one or more embodiments of this specification may be provided as a method, a system, or a computer program product. Therefore, one or more embodiments of this specification may take the form of an entirely hardware embodiment, an entirely software embodiment, or an embodiment combining software and hardware aspects. Moreover, one or more embodiments of this specification may adopt a form of a computer program product implemented on one or more computer-usable storage media (including but not limited to disk storage, CD-ROM, optical storage, etc.) containing computer-usable program codes therein.

One or more embodiments of this specification are described with reference to flowcharts and/or block diagrams of methods, devices (systems), and computer program products according to embodiments of the present specification. Each process and/or block in the flowcharts and/or block diagrams, and combinations of processes and/or blocks in the flowcharts and/or block diagrams may be implemented by computer program instructions. These computer program instructions may be provided to a processor of a general-purpose computer, special-purpose computer, embedded processor, or other programmable data processing device to produce a machine, so that the instructions generated by the processor of the computer or other programmable data processing device are used to generate an device for implementing the functions specified in one or more flows in the flowcharts and/or one or more blocks in the block diagrams.

These computer program instructions may also be stored in a computer-readable memory capable of directing a computer or other programmable data processing devices to work in a specific manner such that the instructions stored in the computer-readable memory produce a manufactured article including an instruction apparatus. The instruction apparatus implements the functions specified in one or more flows in the flowcharts and/or one or more blocks in the block diagrams.

These computer program instructions may also be loaded onto a computer or other programmable data processing devices, so that a series of steps may be performed on the computer or other programmable devices to produce a computer-implemented process, which may be executed on the computer or other programmable devices. The instructions provide steps for implementing functions specified in one or more flows in the flowcharts and/or one or more blocks in the block diagrams.

In a typical configuration, a computing device includes one or more processors (CPUs), input/output interfaces, network interfaces, and memory.

A memory may include non-persistent memory, random access memory (RAM), and/or non-volatile memory in computer-readable media, such as read-only memory (ROM) or flash memory (flash RAM). Memory is an example of a computer-readable medium.

Computer-readable media includes permanent and non-persistent, removable and non-removable media. Information storage may be implemented by any method or technology. Information may be computer-readable instructions, data structures, modules of a program, or other data. Examples of computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technology, read-only disc read-only memory (CD-ROM), digital versatile disc (DVD) or other optical storage, magnetic tape cartridges, magnetic tape storage or other magnetic storage devices or any other non-transmitting medium be used to store information that may be accessed by a computing device. As defined herein, computer-readable media does not include temporary computer-readable media (transitory media), such as modulated data signals and carriers.

The terms "including", "comprising" or any other variants thereof are intended to cover non-exclusive inclusion, so that a process, method, product or device that includes a series of elements includes not only those elements but also other elements not explicitly listed, or those that are inherent to such a process, method, product, or device. Without more restrictions, the elements defined by the sentence "including a . . . " do not exclude the existence of other identical elements in the process, method, product or device including the elements.

One or more embodiments of this specification may be described in the general context of computer-executable instructions executed by a computer, such as program modules. Generally, program modules include routines, programs, objects, components, and data structures that perform specific tasks or implement specific abstract data types. The present specification may also be practiced in distributed computing environments in which tasks are performed by remote processing devices connected through a communications network. In a distributed computing environment, program modules may be in local and remote computer storage media, including storage devices.

Each embodiment in this specification is described in a progressive manner, and the same or similar parts between the various embodiments may be referred to each other. Each embodiment focuses on the differences from other embodiments. In particular, for the system embodiment, since it is basically similar to the method embodiment, the description is relatively simple. For the relevant parts, refer to the description of the method embodiment.

The foregoing descriptions are merely one or more embodiments of this specification but are not intended to limit the protection scope of this specification. For those skilled in the art, various modifications and changes may be made to one or more embodiments of this specification. Any modification, equivalent replacement, and improvement made within the spirit and principle of one or more embodiments of this specification shall be included in the scope of claims of one or more embodiments of this specification.

What is claimed is:

1. A voice broadcast method, comprising:
   acquiring, by a server, at least one piece of voice information, wherein the at least one piece of voice information includes a voice message and a voice identifier that identifies the voice message;
   delivering, by the server, the at least one piece of voice information to a voice broadcast device such that the voice broadcast device stores the at least one piece of voice information;
   determining, by the server, that the voice message is to be broadcast by the voice broadcast device; and
   sending, by the server to the voice broadcast device, the voice identifier without sending the voice message to enable the voice broadcast device to obtain the voice message stored at the voice broadcast device according to the voice identifier, and to broadcast the voice message to a user associated with the voice broadcast device when a preset voice broadcast condition is met.

2. The method according to claim 1, wherein the determining, by the server, that the voice message is to be broadcast by the voice broadcast device comprises:
   determining, by the server according to a preset voice broadcast rule, whether the voice broadcast device needs to broadcast a voice message; and
   determining, by the server in response to determining that the voice broadcast device needs to broadcast a voice message, that the voice message is to be broadcast by the voice broadcast device.

3. The method according to claim 2, wherein the determining, by the server according to a preset voice broadcast rule, whether the voice broadcast device needs to broadcast a voice message comprises:
   determining by the server, that the voice broadcast device needs to broadcast the voice message, in response to:
   a total number of broadcasts in a first designated time segment is less than a first preset threshold,
   a first duration from the last broadcast of a voice message reaches a preset duration, or
   a number of consecutive broadcasts of voice messages in a second designated time segment reaches a second preset threshold.

4. The method according to claim 1, wherein the determining, by the server, that the voice message is to be broadcast by the voice broadcast device comprises one of the following:
   determining, by the server, the voice message according to a preset carousel broadcasting rule, wherein the carousel broadcasting rule is configured to specify a broadcasting order of voice messages to be broadcast by the voice broadcast device, wherein the voice message is determined according to personal information or preference information of the user associated with the voice broadcast device.

5. The method according to claim 1, wherein the acquiring, by a server, at least one piece of voice information comprises:
   acquiring, by the server, information related to the voice broadcast device, wherein the information related to the voice broadcast device includes at least one of the following: user information of the user associated with the voice broadcast device, behavior information of the user, preference information of the user, and location information of the voice broadcast device; and
   acquiring, by the server according to the information related to the voice broadcast device, the at least one piece of voice information corresponding to the voice broadcast device.

6. The method according to claim 1, wherein the delivering, by the server, the at least one piece of voice information to a voice broadcast device comprises:
   determining, by the server, if there is a task of delivering voice information to other voice broadcast devices, priorities respectively corresponding to the voice broadcast device and other voice broadcast devices; and
   determining, by the server according to the priorities respectively corresponding to the voice broadcast device and the other voice broadcast devices, a delivery time of the at least one piece of voice information, and delivering, by the server according to the delivery time, the at least one piece of voice information to the voice broadcast device.

7. The method according to claim 1, further comprising:
   obtaining, by the server, when an update is performed on the at least one piece of voice information, the updated at least one piece of voice information, wherein the update includes at least one of adding, deleting, or modifying the at least one piece of voice information; and
   delivering, by the server, the updated at least one piece of voice information to the voice broadcast device.

8. The method according to claim 1, wherein the voice message includes a transaction voice message, and the determining, by the server, that the voice message is to be broadcast by the voice broadcast device comprises:
   determining, by the server according to a number of transactions or a transaction amount of the user associated with the voice broadcast device, the transaction voice message to be broadcast by the voice broadcast device.

9. The method according to claim 8, wherein the determining, by the server according to a number of transactions or a transaction amount of the user, the transaction voice message to be broadcast by the voice broadcast device comprises:
   acquiring, by the server, a preset mapping relationship between the number of transactions and voice messages, or between transaction amounts and voice messages;
   determining, by the server, whether the number of transactions reaches a predetermined number threshold, or determining, by the server, whether the transaction amount reaches a predetermined amount threshold; and
   in response to determining that the number of transactions reaches the predetermined number threshold or that the transaction amount reaches the predetermined amount threshold, determining, by the server according to the mapping relationship, the transaction voice message to be broadcast by the voice broadcast device.

10. A non-transitory computer-readable storage medium configured with instructions executable by one or more processors to cause the one or more processors to perform operations comprising:
    acquiring at least one piece of voice information, wherein the at least one piece of voice information includes a voice message and a voice identifier that identifies the voice message;
    delivering the at least one piece of voice information to a voice broadcast device such that the voice broadcast device stores the at least one piece of voice information;
    determining that the voice message is to be broadcast by the voice broadcast device; and
    sending, to the voice broadcast device, the voice identifier without sending the voice message to enable the voice broadcast device to obtain the voice message stored at the voice broadcast device according to the voice identifier, and to broadcast the voice message to a user associated with the voice broadcast device when a preset voice broadcast condition is met.

11. The non-transitory computer-readable storage media according to claim 10, wherein the determining that the voice message is to be broadcast by the voice broadcast device comprises:
    determining, according to a preset voice broadcast rule, whether the target voice broadcast device needs to broadcast a voice message; and
    determining, in response to determining that the voice broadcast device needs to broadcast a voice message, that the voice message is to be broadcast by the voice broadcast device.

12. A voice broadcast device, comprising:
    one or more processors; and
    a memory storing instructions executable by the one or more processors to cause the one or more processors to perform operations comprising:
    acquiring at least one piece of voice information, wherein the at least one piece of voice information includes a voice message and a voice identifier that identifies the voice message;
    delivering the at least one piece of voice information to a voice broadcast device such that the voice broadcast device stores the at least one piece of voice information;
    determining that the voice message is to be broadcast by the voice broadcast device; and
    sending, to the voice broadcast device, the voice identifier without sending the voice message to enable the voice broadcast device to obtain the voice message stored at the voice broadcast device according to the voice identifier, and to broadcast the voice message to a user associated with the voice broadcast device when a preset voice broadcast condition is met.

13. The device according to claim 12, wherein the determining a first voice message to be broadcast by the voice broadcast device comprises:
    determining, according to a preset voice broadcast rule, whether the target voice broadcast device needs to broadcast a voice message; and
    determining, in response to determining that the voice broadcast device needs to broadcast a voice message, that the voice message is to be broadcast by the voice broadcast device.

14. The device according to claim 13, wherein the determining, according to a preset voice broadcast rule, whether the voice broadcast device needs to broadcast the voice message comprises:

determining, that the voice broadcast device needs to broadcast the first voice message, in response to:

a total number of broadcasts in a first designated time segment is less than a first preset threshold,     a first duration from the last broadcast of a voice message reaches a preset duration, or     a number of consecutive broadcasts of voice messages in a second designated time segment reaches a second preset threshold.

15. The device according to claim 12, wherein the determining that the voice message is to be broadcast by the voice broadcast device comprises one of the following:

determining the voice message according to a preset carousel broadcasting rule, wherein the carousel broadcasting rule is configured to specify a broadcasting order of voice messages to be broadcast by the voice broadcast device, wherein the voice message is determined according to personal information or preference information of the user associated with the voice broadcast device.

16. The device according to claim 12, wherein the acquiring at least one piece of voice information comprises:

acquiring, by the server, information related to the voice broadcast device, wherein the information related to the voice broadcast device includes at least one of the following: user information of the user associated with the voice broadcast device, behavior information of the user, preference information of the user, and location information of the voice broadcast device; and     acquiring, by the server according to the information related to the voice broadcast device, the at least one piece of voice information corresponding to the voice broadcast device.

17. The device according to claim 12, wherein the delivering the at least one piece of voice information to a voice broadcast device comprises:

determining, if there is a task of delivering voice information to other voice broadcast devices, priorities respectively corresponding to the voice broadcast device and other voice broadcast devices;

determining, according to the priorities respectively corresponding to the voice broadcast device and the other voice broadcast devices, a delivery time of the at least one piece of voice information, and delivering, according to the delivery time, the at least one piece of voice information to the voice broadcast device.

18. The device according to claim 12, wherein the operations further comprise:

obtaining, when an update is performed on the at least one piece of voice information, the updated at least one piece of voice information, wherein the update includes at least one of adding, deleting, or modifying the at least one piece of voice information; and     delivering the updated at least one piece of voice information to the voice broadcast device.

19. The device according to claim 12, wherein the voice message includes a transaction voice message, and the determining that the voice message is to be broadcast by the voice broadcast device comprises:

determining, according to a number of transactions or a transaction amount of the user associated with the voice broadcast device, the transaction voice message to be broadcast by the voice broadcast device.

20. The device according to claim 19, wherein the determining, according to a number of transactions or a transaction amount of the user, the transaction voice message to be broadcast by the voice broadcast device comprises:

acquiring a preset mapping relationship between the number of transactions and voice messages, or between transaction amounts and voice messages;

determining whether the number of transactions reaches a predetermined number threshold, or determining, by the server, whether the transaction amount reaches a predetermined amount threshold; and     in response to determining that the number of transactions reaches the predetermined number threshold or that the transaction amount reaches the predetermined amount threshold, determining, according to the mapping relationship, the transaction voice message to be broadcast by the voice broadcast device.

\* \* \* \* \*